United States Patent Office 3,230,361
Patented Jan. 18, 1966

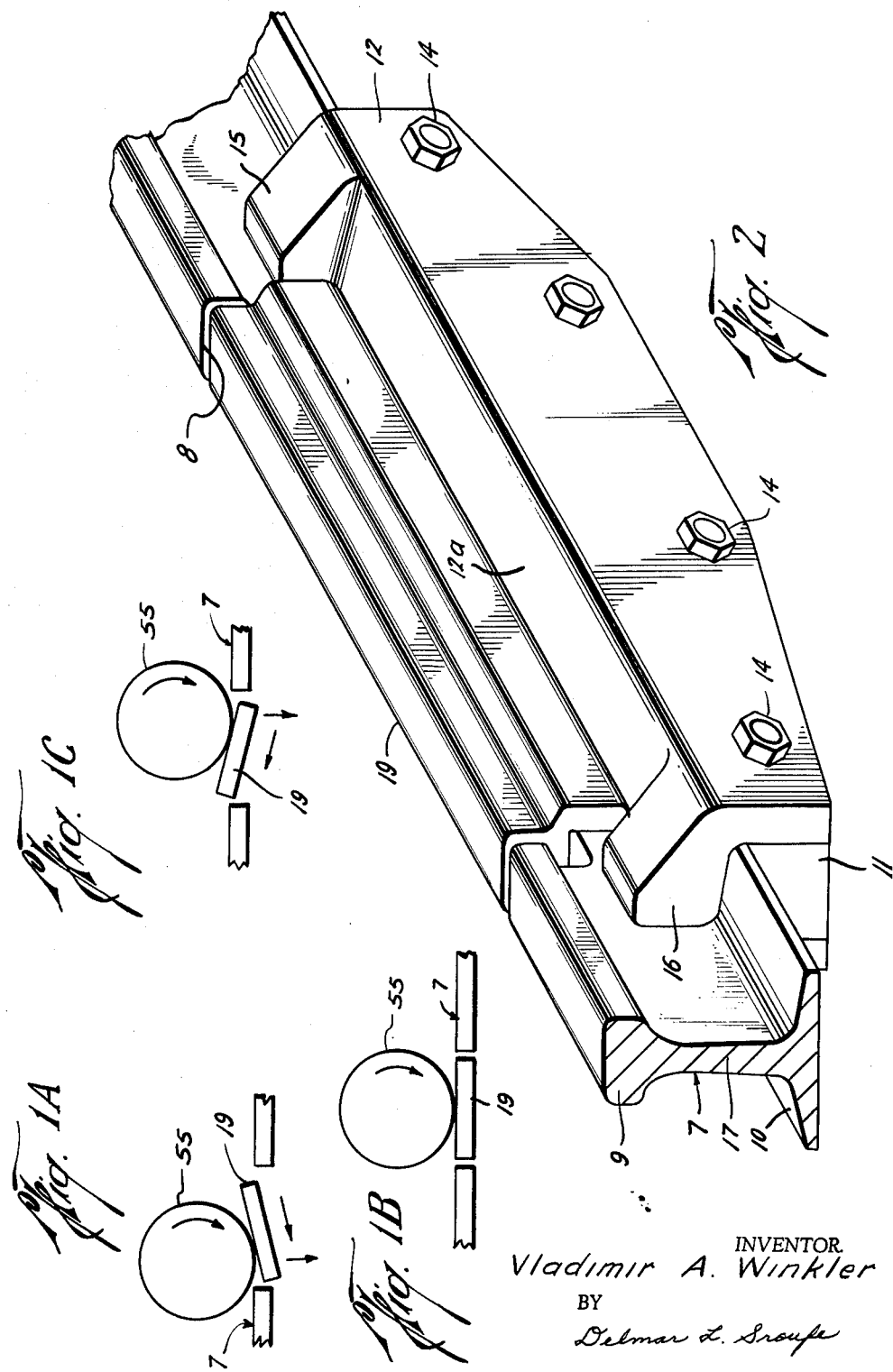

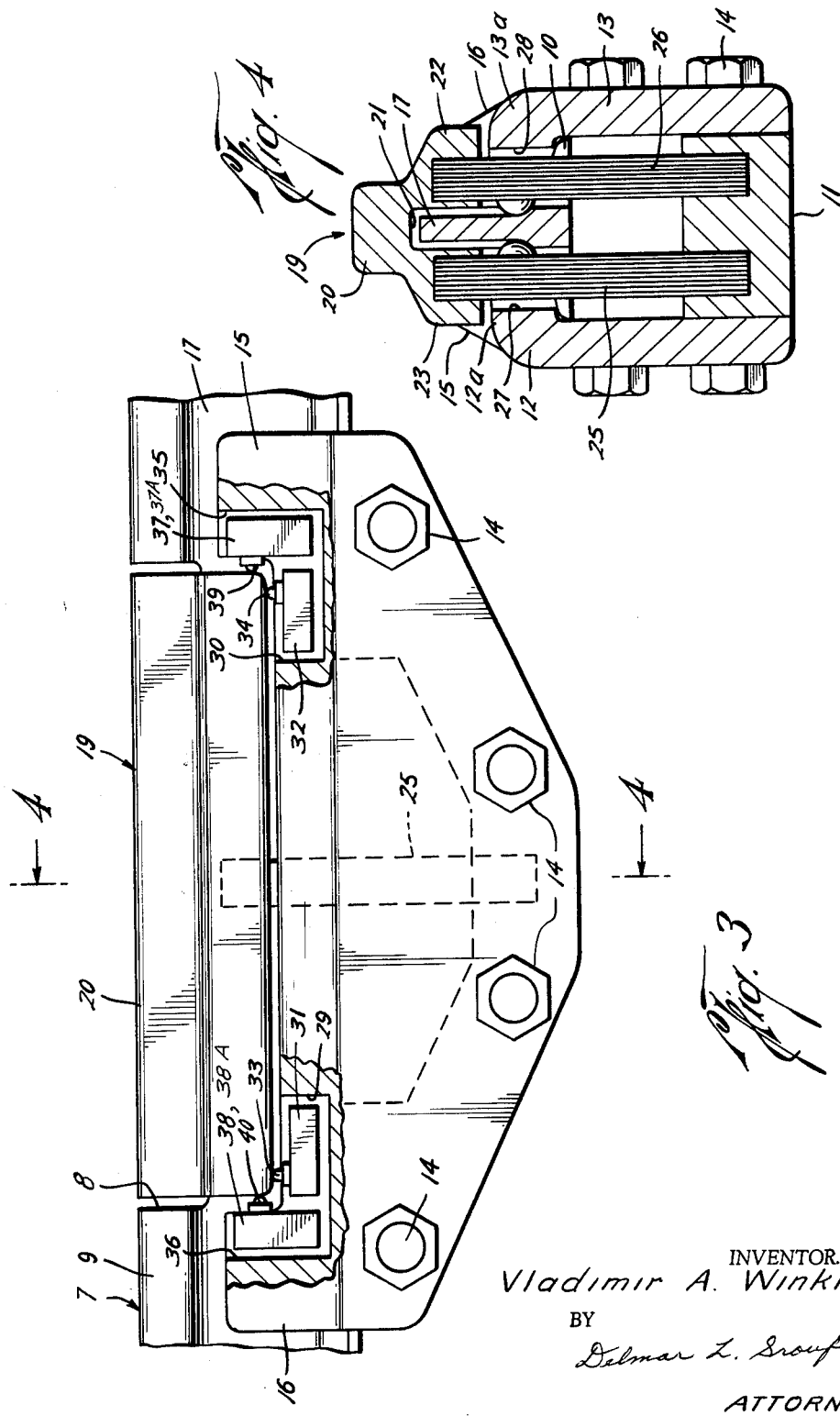

3,230,361
SYSTEM FOR DETERMINING THE EFFORT EXERTED BY A ROLLING TRAIN WHEEL
Vladimir A. Winkler, 4010 Calendar St., Houston, Tex.
Filed Apr. 22, 1963, Ser. No. 274,466
7 Claims. (Cl. 246—246)

This invention relates to a system for detecting and indicating whether a moving wheel of a locomotive or of a car of a railway train is exerting tractive effort, exerting braking effort, or exerting neither braking nor tractive effort.

It is frequently necessary to determine whether individual wheels of locomotive units of a train are rolling free or exerting braking or tractive effort. In some instances, it is also necessary or highly desirable to determine whether the wheels of railway cars of such a train are rolling free or exerting a braking effort. Various tests have been used to check the brakes of railway cars and to check the power and braking performance of locomotive power wheels to determine whether they are functioning properly. With respect to diesel electric locomotives, tests of the power wheels are routinely conducted whenever the traction motors are disconnected and reconnected. It has been customary to conduct several tests of such wheels to make certain that one or more motors are not operating in reverse as a result of mismatching of the traction motor leads during the reconnecting operation. A tractive motor rotation test may be performed by rapidly increasing power to cause the wheels to slip and visually observing the direction of rotatation, and a power test may be conducted by checking to make certain that each unit of a multi-unit locomotive is drawing current from the generators. In addition elaborate tests of the electric circuits in the field loop of a multi-unit locomotive may be conducted. Such tests, however carefully they may be conducted, are often inconclusive and they are time consuming and costly.

It is accordingly an object of this invention to provide means for automatically detecting and indicating the tractive, braking and rolling functions of individual wheels of a railway train during movement of the train upon a track.

It is a further object of this invention to provide detecting and indicative means to determine any malfunction in the exerted effort of a power wheel of a diesel-electric locomotive.

Various other objects and advantages will appear from the following description of an embodiment of the invention, and the novel features will be particularly pointed out hereinafter in connection with the appended claims. The foregoing objects are accomplished in the practice of my invention by the provision of a test section in a gap in a rail together with means for determining the direction of travel of the wheel across the test section, means for detecting and indicating tractive or braking effort exerted on such test section, and electric means for automatically indicating the absence of tractive or braking effort and for analyzing and indicating tractive or braking effort regardless of the direction of movement of the wheel across the test section.

In the drawings:

FIG. 1A is a schematic side view of a portion of the test system illustrating initial contact of a moving wheel on a test section of this invention.

FIG. 1B is a schematic side view of the test system in FIG. 1A illustrating the position of the test section as the moving wheel reaches the center of said test section.

FIG. 1C is another schematic side view of the test system of FIG. 1A illustrating the position of the test section after the wheel moves past the center of said test section.

FIG. 2 is an axionometric representation of a section of track with the test asembly of my invention installed therein.

FIG. 3 is a side view of the section of track down in FIG. 2 with a portion of the test assembly cut away.

FIG. 4 is a vertical section taken along line 4—4 in FIG. 3.

Figure 5:
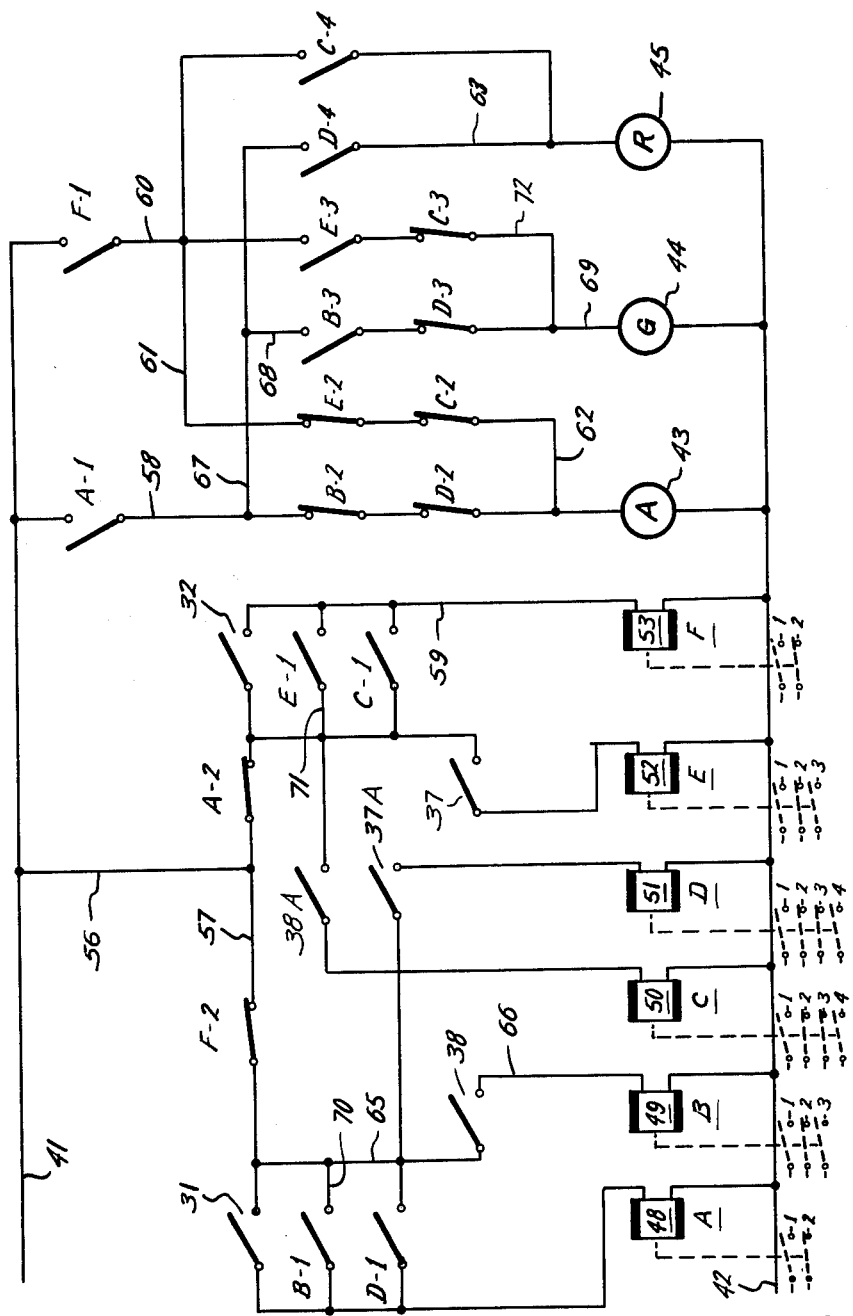
FIG. 5 is a circuit diagram of the test system.

The novel test assembly, as shown in FIGS. 2, 3 and 4 is applicable to a standard rail section 7 having a gap 8 in the ball portion 9 thereof which is of substantially less length than the distance between the rail contacting surfaces of adjacent wheels on vehicles to be tested. Lodged beneath the flange 10 of the rail is a base member 11 of substantially the same width as the flange and somewhat longer than gap 8 so as to completely underlie and reinforce the same as well as the adjacent rail portions. Base member 11 is securely clamped to the rail by means of a pair of heavy angle bars 12 and 13, the lower edges of which are shaped to conform with the contour of base member 11 (FIG. 3). The angle bars are secured to base member 11 by means of bolts 14 and have terminal nose portions 15 and 16 which firmly abut the web 17 of the rail. The under surfaces of the top flange portions 12A and 13A of the angle bars rest upon the sloping upper surfaces of the rail flanges so that the cutaway part of the rail is firmly clamped and supported.

Rather loosely received in gap 8 is a floating test section 19 having an upper portion 20 cross sectionally simulating the upper portion of the rail ball portion 9 and, in effect, forming a continuation thereof. The under surface of test section 19 is longitudinally recessed as at 21 for receiving the rail web portion 17 and the sides of the test section are thickened, as at 22 and 23.

The test rail section 19 is normally resiliently supported in a centered position in gap 8 and slightly spaced both from the end walls of the gap and from the upper surfaces of angle bar flanges 12A and 13A, by means of a pair of vertical flexing bars 25 and 26. These bars are tightly secured in recesses provided therefor in base member 11 and also in the under surfaces of thickened side portions 22 and 23 of test rail section 19. The test section, accordingly, is mounted by flexing bars 25 so as to permit slight, frictionless rotation or oscillations of the test section in the nature of a rocking action in a vertical plane substantially parallel to the longitudinal direction of said section of track and also slight longitudinal reciprocation thereof in the direction of said track.

The upper flanges 12A and 13A of the clamping angle bars are centrally recessed, as at 27 and 28 to accommodate the flexing bars. One of these angle bars 12 is provided with longitudinally spaced recesses 29 and 30 in the upper surface of its flange 12A, near the ends thereof, in which are mounted switches 31 and 32, preferably micro switches. Switches 31 and 32 have upwardly projecting actuators 33 and 34 which are positioned to engage the overlying under surfaces of side portion 23 of the test rail section upon rotation thereof. The switches are positioned so that upon rotation of the test section to a counterclockwise rotated position, micro switch 31 will be actuated, while upon rotation to a clockwise rotated position of the test section the other micro switch 32 will be actuated. Other recesses or pockets 35 and 36 are provided in the opposing interfaces of angle bar terminal nose parts 15 and 16 for accommodating two pole micro switches 37, 37A and 38, 38A having longitudinally projecting actuators 39 and 40 normally engaging the confronting ends of thickened side portion 23 of the test section. Two pole micro switches 37, 37A and 38, 38A are positioned to detect horizontal displacement of the test section so that when the test section is biased leftwardly with respect to the main body of the rail, switch 38, 38A will be actuated and when test rail section is relatively biased rightwardly, the other switch 37, 37A will be actuated. Downward movements of the test rail section are limited by engagement thereof with the upper surfaces of the clamping angle bar top flanges, while longitudinal reciprocations of the test rail section are limited by engagement thereof with the adjacent rail ends. When testing a pair of wheels mounted solidly on an axle, a test section or other yieldably mounted section should be provided in each rail so as to facilitate braking or tractive movement of the wheels, but only one such section need be equipped with sensing means such as illustrated with the test section 19.

In the wiring diagram of FIG. 5, the micro switches 31 and 32 and two pole micro switches having contacts 37 and 37A and 38 and 38A are shown in circuit between the electric power source lines 41 and 42, with relays designated generally by the letters A, B, C, D, E and F and a no-power indicator, a tractive effort indicator and a braking effort indicator for which I provide amber, green and red lights 43, 44 and 45. For clearness of illustration, the working contacts of the various relays are shown in dotted lines immediately adjacent their energizing coils and also in solid lines in the schematic wiring diagram. The relay contacts are designated A-1, A-2, B-1, B-2, etc. and are shown in their normal or unactuated positions.

Relay A has working contacts A-1 (normally open) and A-2 (normally closed). Relay B has working contacts B-1 and B-3, normally open, and B-2, normally closed. Relay C has working contacts C-1 and C-4 normally open and C-2 and C-3, normally closed. Relay D has working contacts D-1 and D-4, normally open, and D-2 and D-3 normally closed. Relay E has working contacts E-1 and E-3 normally open and E-2 normally closed. Relay F has working contact F-1 normally open and F-2 normally closed. The actuating coils of the relays are designated respectively 48, 49, 50, 51, 52 and 53, as shown.

FIGS. 1A, 1B, and 1C diagrammatically represent the passage of a wheel 55 over a test section 19. Relays A and F are, respectively, the rightward and leftward direction sensing controls, acting in response to the closing of micro switches 31 and 32 which function as weight detecting means. When a car wheel rolls freely upon the test section in a rightward direction, the test rail section first will be rotated in counterclockwise direction so as to close micro switch 31. Power is then led through wires 56 and 57, the still closed relay contact F-2 and micro switch 31 to energize coil 48 of relay A. Closing of relay contact A-1 directs power through a wire 58 and normally closed relay contacts B-2 and D-2 to energize the amber light 43. As the wheel is centered upon the test section, micro switch 31 opens and amber light 43 goes out momentarily. Shortly thereafter, the test rail section is rotated clockwise closing micro switch 32 so as to direct power through wire 56, the now closed relay contact A-2, micro switch 32, and wire 59 to coil 53 of relay F. Closing of relay contact F-1 will direct power via wires 60 and 61, closed relay contacts E-2 and C-2 and wire 62 to again energize amber light 43. Thus, illumination of the amber light indicates that a wheel exerting neither braking nor tractive effort has rolled across the test section in either direction.

Now assume a wheel 55 exerting a forward tractive force moves across the test section from left to right. First, micro switch 31 is closed as before. However, at the same time, a leftward horizontal bias will be applied to the test rail section which will cause it to engage and actuate micro switch 38 thus supplying power through wires 56, 57, 65 and 66 to energize coil 49 of relay B. Such simultaneous or sequenced closing of relay contacts A-1 and B-3, reflecting vertical and leftward bias of the left end of the test rail section, will act through wires 58, 67 and 68 and normally closed relay contacts D-3 to energize green lamp 44. Normally closed contact B-2 will open to prevent amber light 43 from being illuminated. In case a forwardly powered wheel passes over the test section from right to left, micro switches 32 and 37 will close, either together or in close sequence, energizing relay coils 53 and 52. Normally closed relay contact F-2 will open, thus opening contact A-1 and extinguishing the amber light. Relay contact E-3 will close to cooperate with now closed relay contacts F-1 and C-3 to energize green light 44 through wires 60, 72 and 69. In each case, closing of either of bypass circuits 70 or 71 by means of relay contacts B-1 or E-1 together with the closing of one of contacts A-2, F-2 will maintain the green light burning so long as the longitudinal bias is maintained irrespective of the subsequent condition of oscillation sensing micro switches 31 and 32.

Finally, assume that the wheel 55 rolling rightwardly across the test rail section tends to resist free rolling action, in other words, is subjected to dynamic or other braking action. Micro switch 31 will first close, energizing coil 48 of relay A, but concurrently therewith or very shortly thereafter pole 37A of two pole micro switch 37, 37A will be actuated, energizing coil 51 of relay D. Opening of contact D-2 and D-3 will extinguish the amber and green lights, while closing contact D-4 will illuminate the red light through contacts A-1 and wires 60 and 63. In case a leftwardly moving, braked wheel 55 should cross the test rail section micro switches 32 and pole 38A of two pole micro switch 38, 38A will be actuated, energizing coils 53 and 50 of relays F and C. Contacts F-1 will close to power wires 60 and 61, but opening of contacts C-2 and C-3 will deenergize the amber and green light while closing of contacts C-4 will again illuminate the red light. Closed contacts C-1 will hold the red light illuminated as long as the test section is horizontally biased by the braking action of wheel 55, just as contact D-1 will hold the red light during opposite movement of a braked wheel.

It will be noted that relay contacts D-3 and C-3 could be omitted without affecting the operation of the system. I presently prefer to utilize these relay contacts as a safety measure to reduce the chance that a malfunction of an element of the system might cause the tractive effort indicator to give a false indication that tractive effort is being exerted by a power wheel of a locomotove. Such additional safety measure is considered desirable, even though not necessary, since the test system is frequently utilized to test the power wheels of a diesel electric locomotive to make certain that the lead wires to one or more of the motors have not been mismatched. In such test the locomotive is caused to pass over the test section with power on all of the wheels and a green light will be illuminated as each power wheel passes over the test section to thereby indicate that the motors are properly connected.

In some aspects, my system can best be regarded as two separate but interconnected subcombination systems in which each subcombination functions to detect the approach direction of the wheel by detecting the initial response of the test section to the weight exerted by the wheel. This initial weight detection, as a result of the first rotation of the test section opens the circuit to the other subcombination system by the action of relays A or F (which function as direction sensing controls). The subcombination which is not canceled out by the opening of such circuit then detects and analyzes the direction of any horizontal force exerted on the test section with respect to the direction of travel of the wheel. From the horizontal bias of the test section, it analyzes the sense of tractive effort which, broadly speaking, may be the complementary tractive effort usually designated as tractive effort or it may be a tractive effort of negative sense, i.e., a braking effort. A horizontal displacement or biasing of the test section with respect to adjacent portions of the rail toward the point of initial contact of the wheel 55 on test section 19 will be automatically detected and indicated as a tractive effort. Thus, with respect to the operative subcombination, the micro switch located to detect such horizontal movement in a direction toward the point of initial contact of the wheel 55 on test section 19 functions as a tractive effort detecting means. The switch serving this function may be either switch 38 or switch 37 depending upon the subcombination activated by the direction of movement of wheel 55 across the test member. A horizontally moved position of the test section 19 away from the detected point of initial contact on the test section will in like manner be detected by the braking effort detecting means of said operative subcombination which, in the disclosed embodiment, consists of the micro switch located to detect horizontal movement away from the point of initial contact of the wheel on the test section. The latter horizontally displaced position is indicated as heretofore described by the operation of the system to connect the braking effort indicating means to the electric power source.

In the operation of the two subcombination systems, it will be noted that the movement of the wheel past the mid portion of the test section will not reactivate the canceled subcombination except in the case of a wheel exerting neither tractive nor braking effort. In the latter situation, both subcombination systems function in sequence and the amber light will be eliminated during the travel of the wheel over approximately the first half of the distance across the test section. After a momentary disconnection as the wheel passes the mid point in its travel across the test section, the other subcombination will be activated and the amber light will be again illuminated for the latter portion of the wheel's travel across the test section.

It will be understood that various changes in details, materials, steps and arrangements of parts, which have been herein described and illustrated in order to explain the nature of the invention, may be made by those skilled in the art without departing from the principles and scope of the invention as expressed in the appended claims. Accordingly, I do not wish to be limited to the particular embodiment disclosed herein as an illustration of my invention, and I contemplate by the appended claims to cover any such modifications as fall within the true spirit and scope of my invention.

What I claim as new and desire to secure by Letters Patent:

1. Apparatus for testing railway vehicle wheels comprising a length of rail having a gap therein, a rail section loosely received in said gap, base structure beneath said gap, flexible beam means lodged at its base in said structure and secured at its upper extremity medially to said rail section and supporting said section medially while permitting rocking and longitudinal movements thereof within the confines of said gap, and means for sensing movements of said rail section.

2. Apparatus for testing a powered vehicle wheel comprising a track over which the wheel may roll and having a test section free for limited longitudinal play and vertical rocking action relative to the adjacent track portions, means pivotally supporting said section and maintaining the same resiliently centered between said portions, direction sensing microswitches positioned beneath the ends of said section for varying sequential actuation in accordance with the direction of movements of the wheel along the track, other microswitches abreast of the ends of said test section in position to be selectively actuated upon longitudinal biasing of said section in opposite directions relative to said adjacent track portions, signal elements, and circuit means including said signal elements and all of said switches and responsive to sequential actuation of said direction sensing microswitches while said other microswitches remain deactivated to indicate absence of tractive or braking effort applied to said wheel and also responsive to sequential actuation of said direction sensing switches accompanied by acutation of either of said other switches for indicating the existence of tractive or braking effort applied by said wheel to said test section.

3. Apparatus for testing a powered wheel of a vehicle for tractive effort or drag comprising a track having a test section along which the wheel may be moved, means mounting said section for longitudinal movements and vertical rocking movements relative to adjacent portions of the track as a wheel rolls thereover, means for sensing the order of depression of the ends of said section for thereby detecting the direction of movement of the wheel along the track, means for sensing longitudinal biasing of said section relative to said adjacent track portions, and means providing different indications for different test section biasing relative to a particular direction of movement of the wheel along the track.

4. The device as described in claim 3 in which said means providing different indications for different test section biasing comprises electric switches abreast the ends of said test section in position to be closed by longitudinal movement of the test section in the direction opposed to the direction of movement of said wheel, to indicate braking effort applied to said wheel, and other switching means arranged to be closed by longitudinal movement of the test section in the direction opposite the movement of the wheel to indicate tractive force applied to the wheel.

5. Apparatus for testing a vehicle wheel for power and drag comprising a track over which the wheel may roll and having a test section free for limited longitudinal play relative to the adjacent track portions, means resiliently centering said section between said portions, wheel drag and power sensing microswitch devices respectively between the opposite ends of said section and said adjacent track portions and respectively closed upon biasing of said section in the direction of movement of the wheel and in the opposite direction, first, second, and third signal devices, drag and power responsive relays, respectively, electrically connected to said microswitches and energized by closing thereof, a first circuit including a normally-open contact of said wheel drag responsive relay and said first signal device for indicating dragging of said wheel, a second circuit including a normally-open contact of said wheel power responsive relay and said second signal device for indicating powering of the wheel, and a third circuit including in series normally-closed contacts of both of said relays and said third signal device for indicating absence of drag or powering of the wheel.

6. Wheel test apparatus as described in claim 5 further including means supporting said section for limited vertical action, a weight sensitive microswitch beneath said section, and a vehicle weight responsive relay connected to said last-mentioned microswitch for energization thereby upon depression of said section, said third circuit also including a normally-open contact of said last-mentioned relay for indicating absence of drag or powering of a wheel thereon.

7. Test apparatus for indicating tractive and braking effort exerted by a railway vehicle wheel or absence of either comprising
    a track section having a gap,
    a test track section loosely received in said gap,
    spring means mounting and resiliently centering said section while permitting longitudinal deflection and vertical rocking of said section relative to the adjacent track portions upon rolling of a vehicle wheel over said section, first and second normally-open switch means closable alternately upon longitudinal deflection of said section in opposite directions, third and fourth normally-open switch means located, respectively, under the ends of said section and closable, respectively, upon counterclockwise and clockwise rocking of said section, first and second endwise play sensitive relays energizable, respectively, upon closing of said first and second switches, first and second direction sensing relays energizable, respectively, upon closing of said third and fourth switches, first, second, and third signal devices for indicating, respectively, tractive or braking effort applied to said test section by a wheel passing thereover or absence of both, a first electrical circuit including in series a first, normally-open contact of said first direction sensing relay and normally-closed contacts of both of said endwise play sensitive relays, a second electrical circuit in parallel with said first circuit and including in series a first normally-open contact of said second direction sensing relay and normally-closed contacts of both of said endwise play sensing relays, said third signal device being connected to said first and second circuits for indicating the passage of a wheel over said test section substantially free of tractive or braking effort, a third circuit including in series a normally-open contact of each of said first direction sensing relay and said first endwise play sensitive relay and a normally-closed contact of said second endwise play sensitive relay, a fourth circuit including in series a normally-open contact of each of said second direction sensing and said second endwise play relays and a normally-closed contact of said first endwise play sensitive relay, said third and fourth circuits being connected in parallel and with said first signal device to indicate tractive effort of a wheel passing in either direction over said test section, a fifth circuit including in series normally-open contacts of said first direction sensing relay and said second endwise play senstive relay, and a sixth circuit including in series normally-open contacts of said second direction sensing relay and said first endwise play sensitive relay, said fifth and sixth circuits being connected in paralellel and with said second signal device for indicating braking effort of a wheel passing in either direction over said test section.

References Cited by the Examiner

UNITED STATES PATENTS

| | | | |
|---|---|---|---|
| 2,837,911 | 6/1958 | Haggadone | 246—246 X |
| 3,033,018 | 5/1962 | Haggadone. | |
| 3,110,463 | 11/1963 | Legg | 246—246 |
| 3,111,294 | 11/1963 | Werner | 246—219 X |
| 3,116,044 | 12/1963 | Stanley | 246—246 |

ARTHUR L. LA POINT, *Primary Examiner.*

JAMES S. SHANK, *Examiner.*

S. T. KRAWCZEWICZ, *Assistant Examiner.*